(No Model.)

I. BROOKE.
WINDOW GRATING.

No. 332,186. Patented Dec. 8, 1885.

WITNESSES:
A. F. Grant
W. F. Kircher

INVENTOR:
Isaac Brooke
BY John A. Wiedersheim
ATTORNEY

N. PETERS, Photo-Lithographer, Washington, D. C.

UNITED STATES PATENT OFFICE.

ISAAC BROOKE, OF POTTSTOWN, ASSIGNOR TO HIMSELF, CASPER S. FRANCIS, OF SPRING CITY, AND SAMUEL B. SHALKOP, OF ROYER'S FORD, PA.

WINDOW-GRATING.

SPECIFICATION forming part of Letters Patent No. 332,186, dated December 8, 1885.

Application filed October 19, 1885. Serial No. 180,243. (No model.)

*To all whom it may concern:*

Be it known that I, ISAAC BROOKE, a citizen of the United States, residing at Pottstown, in the county of Montgomery, State of Pennsylvania, have invented a new and useful Improvement in Window-Gratings, which improvement is fully set forth in the following specification and accompanying drawings, in which—

Figure 1:
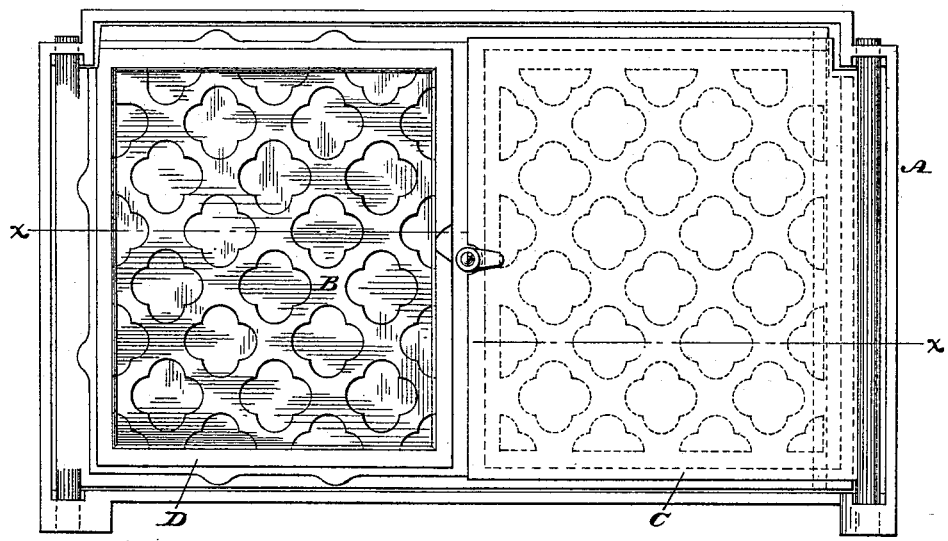
Figure 2:
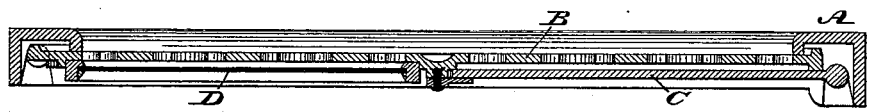

Figure 1 represents a view of the inner face of a window-grating embodying my invention. Fig. 2 represents a horizontal section of a modification.

Similar letters of reference indicate corresponding parts in the two figures.

My invention consists of a window-grating so constructed that it may be partly or entirely opened, whereby light and air or light alone may be admitted into the cellar or apartment, as will be hereinafter fully set forth.

Referring to the drawings, A represents the frame of the grating, which is secured to the walls of a cellar or other apartment, and B represents the grating, which consists of an open plate or bars pivoted to the frame at one side thereof. To one side of the frame A is pivoted an imperforate door, C, which rests against the inner face of the grating B and closes the openings of, say, one-half of said grating. To the grating is secured a glazed sash or pane of glass, D, which, as will be seen, occupies the remaining half of the grating. If desired, the door C may be pivoted to the side of the grating.

The operation is as follows: When it is desired to admit air into the cellar or apartment or ventilate the same, the door C is opened, thus uncovering the respective openings of the grating. By shifting the door said openings are again covered, and the grating is completely closed, preventing the entrance of air, dust, rain, snow, &c., into the cellar or apartment. The sash or glass D closes the portion of the grating in front thereof, preventing the admission of air into the cellar or apartment, but admitting light thereinto at all times, so that while the door C is shut the cellar or apartment is not darkened. When the door is thrown back, the grating may be turned on its pivots, and thus opened for purposes requiring the same.

Figure 3:
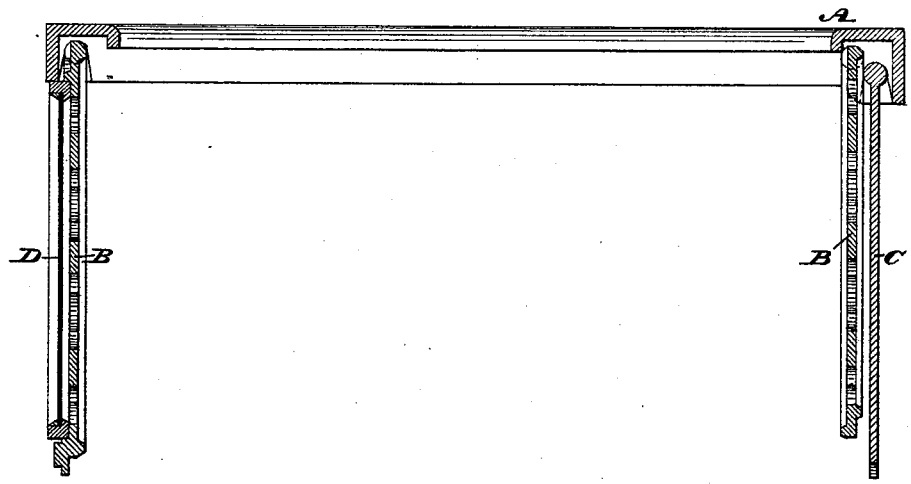

In Fig. 3 I show a modification, in which the grating is divided and the divisions or sections are hinged or pivoted to opposite sides of the frame A, so that the sections may be opened independently of each other.

Having thus described my invention, what I claim as new, and desire to secure by Letters Patent, is—

1. A swinging grating provided with a light of glass and a swinging door, said glass and door occupying opposite sides of the grating, the parts being combined and operating substantially as described.

2. A pivoted grating, in combination with a light of glass and a pivoted imperforate door, substantially as described.

ISAAC BROOKE.

Witnesses:
    JOHN A. WIEDERSHEIM,
    A. P. GRANT.